(12) United States Patent
Labarge et al.

(10) Patent No.: US 6,576,587 B2
(45) Date of Patent: Jun. 10, 2003

(54) HIGH SURFACE AREA LEAN NO$_x$ CATALYST

(75) Inventors: William J. Labarge, Bay City, MI (US); Mark David Hemingway, Columbiaville, MI (US); Joachim Kupe, Davisburg, MI (US); Galen Bruce Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/805,670

(22) Filed: Mar. 13, 2001

(65) Prior Publication Data

US 2002/0132724 A1 Sep. 19, 2002

(51) Int. Cl.$^7$ ................................... B01J 23/58
(52) U.S. Cl. ........................ 502/328; 502/341
(58) Field of Search ................ 502/324, 340, 502/341, 328, 314, 300

(56) References Cited

U.S. PATENT DOCUMENTS

| | | | | |
|---|---|---|---|---|
| 4,904,633 A | * | 2/1990 | Ohata et al. | 502/304 |
| 5,134,108 A | * | 7/1992 | Thakur et al. | 502/318 |
| 5,134,109 A | * | 7/1992 | Uchiyama et al. | 502/324 |
| 5,727,385 A | | 3/1998 | Hepburn | |
| 5,879,645 A | | 3/1999 | Park et al. | |
| 5,906,958 A | | 5/1999 | Park et al. | |
| 5,990,038 A | | 11/1999 | Suga et al. | |

FOREIGN PATENT DOCUMENTS

| | | |
|---|---|---|
| EP | 1036591 A1 | 9/2000 |
| JP | 56002848 A | 1/1981 |
| JP | 2293050 A | 12/1990 |
| JP | 3267151 A | 11/1991 |
| JP | 4338233 A | 11/1992 |
| JP | 4367707 A | 12/1992 |
| JP | 5031367 A | 2/1993 |
| JP | 5192535 A | 8/1993 |
| JP | 5277376 A | 10/1993 |
| JP | 6226052 A | 8/1994 |
| JP | 7100386 A | 4/1995 |
| JP | 7116519 A | 5/1995 |
| JP | 7136518 A | 5/1995 |
| JP | 7328440 A | 12/1995 |
| JP | 8010573 A | 1/1996 |
| JP | 8038888 A | 2/1996 |
| JP | 8038889 A | 2/1996 |
| JP | 8155303 A | 6/1996 |
| JP | 8229355 A | 9/1996 |
| JP | 8281110 A | 10/1996 |
| JP | 9103652 A | 4/1997 |
| JP | 9155185 A | 6/1997 |
| JP | 9225264 A | 9/1997 |
| JP | 9239276 A | 9/1997 |
| JP | 9248462 A | 9/1997 |
| JP | 9253453 A | 9/1997 |
| JP | 10057811 A | 3/1998 |
| JP | 10118457 A | 5/1998 |
| JP | 10118486 A | 5/1998 |
| JP | 10128114 A | 5/1998 |
| JP | 10165819 A | 6/1998 |
| JP | 10192713 A | 7/1998 |
| JP | 10290933 A | 11/1998 |
| JP | 11057477 A | 3/1999 |
| JP | 11169670 A | 6/1999 |
| JP | 11207190 A | 8/1999 |
| JP | 11221466 A | 8/1999 |
| JP | 11226404 A | 8/1999 |

* cited by examiner

*Primary Examiner*—Stanley S. Silverman
*Assistant Examiner*—Edward M. Johnson
(74) *Attorney, Agent, or Firm*—Vincent A. Cichosz

(57) ABSTRACT

A catalyst for adsorbing oxides of nitrogen from the exhaust gases of an internal combustion engine, comprising an alkaline earth active catalyst site, and a transition metal oxide having a surface area of at least about 75 m$^2$/g.

7 Claims, No Drawings

HIGH SURFACE AREA LEAN NO$_X$ CATALYST

BACKGROUND OF THE INVENTION

The present invention relates to a catalyst for purifying exhaust gases from an internal combustion engine. In particular, it relates to a lean NOx catalyst.

It is well known in the art to use catalyst compositions, including those commonly referred to as three-way conversion ("TWC") catalysts to treat the exhaust gases of internal combustion engines. Such catalysts, containing precious metals like platinum, palladium, and rhodium, have been found both to successfully promote the oxidation of unburned hydrocarbons (HC) and carbon monoxide (CO) and to promote the reduction of nitrogen oxides (NOx) in exhaust gas, provided that the engine is operated around balanced stoichiometry for combustion ("combustion stoichiometry"; i.e., between about 14.7 and 14.4 air/fuel (A/F) ratio).

However, fuel economy and global carbon dioxide (CO2) emissions have made it desirable to operate engines under lean-burn conditions, where the air-to-fuel ratio is somewhat greater than combustion stoichiometry to realize a benefit in fuel economy. Diesel and lean-burn gasoline engines generally operate under highly oxidizing conditions (i.e., using much more air than is necessary to burn the fuel), typically at air/fuel ratios greater than 14.7 and generally between 19 and 35. Under these highly lean conditions, typical three-way catalysts exhibit little activity toward NOx reduction, as their reduction activity is suppressed by the presence of excess oxygen.

The control of NOx emissions from vehicles is a world-wide environmental problem. Lean-burn, high air-to-fuel ratio, and diesel engines are certain to become more important in meeting the mandated fuel economy requirements of next-generation vehicles. Development of an effective and durable catalyst for controlling NOx emissions under net oxidizing conditions accordingly is critical.

A leading catalytic technology for removal of NOx from lean-burn engine exhausts involves NOx storage reduction catalysis, commonly called the "lean-NOx trap". The lean-NOx trap technology can involve the catalytic oxidation of NO to NO2 by catalytic metal components effective for such oxidation, such as precious metals. However, in the lean NOx trap, the formation of NO2 is followed by the formation of a nitrate when the NO2 is adsorbed onto the catalyst surface. The NO2 is thus "trapped", i.e., stored, on the catalyst surface in the nitrate form and subsequently decomposed by periodically operating the system under fuel-rich combustion conditions that effect a reduction of the released NOx (nitrate) to N2.

The lean-NOx-trap technology has been limited to use for low sulfur fuels because catalysts that are active for converting NO to NO2 are also active in converting SO2 to SO3. Lean NOx trap catalysts have shown serious deactivation in the presence of SOx because, under oxygen-rich conditions, SOx adsorbs more strongly on NO2 adsorption sites than NO2, and the adsorbed SOx does not desorb altogether even under fuel-rich conditions. Such presence of SO3 leads to the formation of sulfuric acid and sulfates that increase the particulates in the exhaust and poison the active sites on the catalyst. Attempts with limited success to solve such a problem have encompassed the use of selective SOx adsorbents upstream of lean NOx trap adsorbents. Furthermore, catalytic oxidation of NO to NO2 is limited in its temperature range. Oxidation of NO to NO2 by a conventional Pt-based catalyst maximizes at about 250° C. and loses its efficiency below about 100 degrees and above about 400 degrees. Thus, the search continues in the development of systems that improve lean NOx trap technology with respect to temperature and sulfur considerations.

Another NOx removal technique comprises a non-thermal plasma gas treatment of NO to produce NO2 which is then combined with catalytic storage reduction treatment, e.g., a lean NOx trap, to enhance NOx reduction in oxygen-rich vehicle engine exhausts. In the lean NOx trap, the NO2 from the plasma treatment is adsorbed on a nitrate-forming material, such as an alkali material, and stored as a nitrate. An engine controller periodically runs a brief fuel-rich condition to provide hydrocarbons for a reaction that decomposes the stored nitrate into benign products such as N2. By using a plasma, the lean NOx trap catalyst can be implemented with known NOx absorbers, and the catalyst may contain less or essentially no precious metals, such as Pt, Pd and Rh, for reduction of the nitrate to N2. Accordingly, an advantage is that a method for NOx emission reduction is provided that is inexpensive and reliable. The plasma-assisted lean NOx trap can allow the life of precious metal lean NOx trap catalysts to be extended for relatively inexpensive compliance to NOx emission reduction laws. Furthermore, not only does the plasma-assisted lean NOx trap process improve the activity, durability, and temperature window of lean NOx trap catalysts, but it allows the combustion of fuels containing relatively high sulfur contents with a concomitant reduction of NOx, particularly in an oxygen-rich vehicular environment.

Recently, copper-ion exchanged zeolite catalysts have been shown to be active for selective reduction of NOx by hydrocarbons in the presence of excess oxygen. Platinum-ion exchanged zeolite catalyst is also known to be active for NOx reduction by hydrocarbons under lean conditions. However, this catalytic activity is significant only in a narrow temperature range around the lightoff temperature of hydrocarbon oxidation. All the known lean-NOx catalysts reported in the literature tend to lose their catalytic activity for NOx reduction when the catalyst temperature reaches well above the lightoff temperature of hydrocarbon oxidation. This narrow temperature window of the lean-NOx catalysts is considered to be one of the major technical obstacles, because it makes practical application of these catalysts difficult for lean-burn gasoline or diesel engines.). As an example, the Cu-zeolite catalysts deactivate irreversibly if a certain temperature is exceeded. Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-NOx catalysts must overcome all three problems simultaneously before they can be considered for commercial use. In the case of sulfur poisoning, some gasoline can contain up to 1200 ppm of organo-sulfur compounds. Lean-NOx catalysts promote the conversion of such compounds to SO2 and SO3 during combustion. Such SO2 will adsorb onto the precious metal sites at temperatures below 300° C. and thereby inhibits the catalytic conversions of CO, CxHy (hydrocarbons) and NOx. At higher temperatures with an Al2O3 catalyst carrier, SO2 is converted to SO3 to form a large-volume, low-density material, Al2(SO4)3, that alters the catalyst surface area and leads to deactivation. In the prior art, the primary solution to this problem has been to use fuels with low sulfur contents.

Another alternative is to use catalysts that selectively reduce NOx in the presence of a co-reductant, e.g., selective catalytic reduction (SCR) using ammonia or urea as a co-reductant. Selective catalytic reduction is based on the reaction of NO with hydrocarbon species activated on the catalyst surface and the subsequent reduction of NOx to N2. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-NOx catalysts are too susceptible to high temperatures, water vapor and sulfur poisoning (from SOx).

Yet another viable alternative involves using co-existing hydrocarbons in the exhaust of mobile lean-burn gasoline engines as a co-reductant and is a more practical, cost-effective, and environmentally sound approach. The search for effective and durable non-selective catalytic reduction "NSCR" catalysts that work with hydrocarbon co-reductant in oxygen-rich environments is a high-priority issue in emissions control and the subject of intense investigations by automobile and catalyst companies, and universities, throughout the world.

What is needed in the art is an NCSR exhaust gas catalyst system having improved durability, as well as effective NOx management, over extended operating time. The present invention overcomes many of the shortcomings of the prior art.

SUMMARY OF THE INVENTION

Now, according to the present invention, a lean NOx catalyst is provided wherein an active alkaline earth NOx occluding catalyst is coated with one or more transition metal oxides.

The active site necessary for high lean NOx conversion is an alkaline earth. Unfortunately, catalytic materials including alkaline earths are excellent in adsorbing water (e.g., steam) from an exhaust gas stream. The formed alkaline earth-H2O interaction serves effectively to block further adsorption by the alkaline earth active site and the significantly suppresses NOx reduction activity.

Accordingly, some technique for shielding the alkaline earth active site from water is necessary in order to prevent the catalyst activity from decreasing.

It now has been found that the presence of high surface area transition metal oxides will suppress the adsorption of H2O by alkaline earth elements. Unfortunately, most transition metal oxides feature surface areas no greater than about 5 m2/g (meters squared per gram). Typical favored catalyst supports such as aluminum oxide, zirconium stabilized zeolites, zeolites, and the like, have surface areas generally of at least about 150 m2/g.

According to the present invention, an active alkaline earth NOx occluding catalyst is coated with a transition metal oxide having a surface area of at least about 75 m2/g. Preferably, the transition metal oxide particles on the zeolite have a surface area ranging from about 75 m2/g to at least about 150 m2/g. Preferred transition metal oxides include CoO and Mn2O3.

The above-described and other features and advantages of the present invention will be appreciated and understood by those skilled in the art from the following detailed description, drawings, and appended claims.

DESCRIPTION OF PREFERRED EMBODIMENTS

The lean NOx occluding catalyst of the present invention may be any alkaline earth occluding catalyst. The active catalyst materials include alkaline earth metals, such as barium, strontium, calcium, magnesium. Preferred active catalyst materials are alkaline earths including calcium, strontium, and/or barium; strontium and barium are more preferred; barium is particularly preferred.

Preferred NOx occluding catalysts utilized in the present invention includes barium-zeolite, barium-zirconium zeolite, barium-aluminum oxide, and barium-rare earth-zeolite, and the like. Such NOx occluding catalysts having surface areas ranging from at least about 200 m2/g to at least about 500 m2/g are preferred. Particularly preferred are barium-zeolite, barium-zirconium-zeolite, and barium-aluminum oxide.

A preferred catalyst support material is a zirconium oxide doped zeolite. The alkaline earth metal and transition metal may be supported on the zirconium oxide portion of the zeolite. A Y zeolite with a silica to alumina ratio of at least about 30 is preferred; at least about 60 is more preferred; and, about 80 is particularly preferred. A zirconium loading of at least about 1 wt % is preferred; at least about 2 wt % is more preferred; and, about 3 wt % is particularly preferred.

High silica content zeolites having silica to alumina ratios of 30 or more have as little as 0.05 wt % sodium or ammonium sites that can be exchanged with barium. With no zirconium treatment, barium levels up to ~0.5 wt % are possible. Fixing zirconium oxide to the zeolite increases the sites to which the barium can attach. With 3 wt % zirconium doping, 4.5 wt % barium can be accomplished. With 1 wt % zirconium doping, a barium loading of 1.5 wt % can be achieved. With 2 wt % zirconium doping, a barium loading of 3.0 wt % is possible. With 3 wt % zirconium doping, a barium loading of 4.5 wt % is possible. When using barium as the alkaline earth active catalyst site, a loading of at least about 1.5 wt % is preferred; at least about 3.0 wt % is more preferred; and, about 4.5 wt % is particularly preferred.

According to the present invention, an active alkaline earth NOx occluding catalyst is coated with a transition metal oxide. Preferred transition metal oxides include CoO and Mn2O3. With 1 wt % zirconium doping, a cobalt loading of 0.65 wt % can be achieved. With 2 wt % zirconium doping, a cobalt loading of 1.3 wt % is possible. With 3 wt % zirconium doping, a cobalt loading of 1.95 wt % is possible. When using cobalt as the transition metal, a loading of at least about 0.65 wt % is preferred; at least about 1.3 wt % is more preferred; and, about 1.95 wt % is particularly preferred. With 1 wt % zirconium doping, a manganese loading of 0.6 wt % can be achieved. With 2 wt % zirconium doping, a manganese loading of 1.2 wt % is possible. With 3 wt % zirconium doping, a manganese loading of 1.8 wt % is possible. When using manganese, a loading of at least about 0.60 wt % is preferred; at least about 1.2 wt % is more preferred; and, about 1.8 wt % is particularly preferred.

The zeolite preferably has a surface area of at least about 200 m2/g. Zirconium dioxide distributed at specific zeolite sites will have a surface area of at least about 200 m2/g. Barium, cobalt or manganese supported on the zirconium dioxide will also have a surface area of at least about 200 m2/g. Free barium oxide, cobalt oxide or manganese oxide in excess of the specific available sites preferably will have surface areas at least about 150 m2/g.

A barium oxide surface area of at least about 40 m2/g is preferred; at least about 60 m2/g is more preferred; and, at least about 80 m2/g is particularly preferred. A cobalt oxide surface area of at least about 75 m2/g is preferred; at least about 125 m2/g is more preferred; and, about 150 m2/g is particularly preferred. A manganese oxide surface area of at least about 75 m2/g is preferred; at least about 125 m2/g is more preferred; and, about 150 m2/g is particularly preferred. Decomposition of formate precursors results in the smallest particles with the highest surface area, and is a preferred method of introducing the particles.

Transition metals may be supported on specific zeolite sites outside the zeolite structure; transition metals may be supported on specific zeolite sites inside the zeolite structure; transition metal oxides may reside on the exterior surface of the zeolite; and transition metal oxide particles may reside inside the zeolite structure. For optimal performance, it is preferred that the metals (e.g., zirconium, barium, cobalt, and magnesium) be located inside the zeolite pore structure. Further, it is preferred that metals be attached to specific zeolite sites, not as free particles. Zirconium oxide and barium oxide may also reside on the exterior surface for surface area stabilization of the zeolite.

Hydrophobic, high silica content zeolites are desired for their ability to adsorb hydrocarbon species. The hydrocarbon species are necessary as the reducing agents. Transition metals attached to the hydrophobic zeolite are beneficial for adsorption and activation of the hydrocarbons. Transition metal particles on exterior zeolite surfaces, in association with aluminum oxide, initiate combustion of the hydrocarbon, lowering the reducing agent content and greatly decreasing the NOx to N2 conversion.

The alkaline earth active catalyst and zirconium do not combust the organic reducing agents. For example, barium and zirconium on the exterior zeolite surface stabilize the surface area of the zeolite. Barium and zirconium in intimate association with cobalt or manganese inhibit the ability of cobalt to combust the organic reducing agent. Large particles of cobalt or manganese oxide, relatively free of barium particles can greatly decrease the NOx to N2 conversion. If barium or zirconium is present in intimate association with the cobalt or manganese, a greater quantity of cobalt can be supported on the zeolite without combustion of the reducing agent. The barium, zirconium, cobalt or manganese must be supported inside the zeolite structure where there is limited aluminum oxide content. Outside the zeolite structure aluminum oxide from particles and aluminum oxide from binders are present. Cobalt and manganese in close association with the aluminum oxide can greatly increase the decomposition of reducing agent prior to NOx reduction.

Preferably, the maximum internally supported cobalt content of an internally doped zirconium zeolite should not exceed 2.0 wt %. The maximum internally supported cobalt content of an internally doped barium zeolite should not exceed 3.0 wt %. The maximum internally supported manganese content of an internally doped zirconium zeolite should not exceed 2.0 wt %. The maximum internally supported manganese content of an internally doped barium zeolite should not exceed 3.0 wt %.

In a typical process for producing the lean NOx catalyst of the present invention, a Y-zeolite with a silica to alumina ratio of 80 is first reacted with an aqueous solution of a molecule which is too large to enter the zeolite pores and then with a second smaller molecule. For example, ammonium zirconium citrate adsorbs on the exterior zeolite surface blocking adsorption of the smaller zirconium formate. The zirconium formate is able to enter and decompose inside the zeolite cage structure. Heating the zeolite to 500° C. decomposes the added materials. The product has internal and external zeolite surfaces with fine dispersions of zirconium oxide.

The zirconium doped zeolite is then doped with a second element such as barium. For example barium formate and barium citrate are added. The barium citrate adsorbs on the external zirconium-zeolite surface, and the barium formate adsorbs on the internal zirconium-zeolite surface. Heating the zeolite to 500° C. then decomposes those materials. The product is a zeolite surface with dispersions of barium and zirconium internal and external to the zeolite structure.

The elements cobalt and manganese are added only to the internal zeolite structure. A blocking agent such as ammonium citrate is first added to the zeolite. Then after some time, a second material such as cobalt nitrate is added for doping of the internal zeolite surfaces. A third material such as formic acid may be added to break the surface tension of the nitrate material such that a much finer distribution of metal occurs.

Suitable zirconium compounds include zirconium formate, zirconium nitrate, zirconium tetraamine nitrate, zirconium tetraamine citrate, zirconium citrate, zirconium acetate, ammonium zirconium citrate, ammonium zirconium carbonate and zirconium isopropoxide. Zirconium citrate, zirconium acetate, and zirconium formate are preferred; zirconium acetate and zirconium formate are more preferred; and, zirconium formate is particularly preferred.

Suitable aluminum sources include aluminum oxide, boehmite, and pseudoboehmite, and aluminum hydroxide. Aluminum oxide and aluminum hydroxide are preferred; aluminum hydroxide is particularly preferred.

Suitable cobalt compounds include cobalt formate, cobalt acetate, cobalt citrate, cobalt nitrate, cobalt hydroxide, cobalt isopropoxide, cobalt oleate, cobalt octoate, cobalt stearate and cobalt 2-ethylhexanoate. Cobalt acetate is preferred, cobalt citrate is more preferred and cobalt formate is greatly preferred.

Suitable manganese compounds are manganese formate, manganese acetate, manganese citrate, manganese carbonate, manganese hydroxide, manganese isopropoxide, manganese oleate and manganese 2-ethylhexanoate. Manganese acetate is preferred, manganese citrate is more preferred and manganese formate is greatly preferred.

Suitable barium compounds are barium nitrate, barium formate, barium citrate, barium acetate, barium carbonate, barium zirconium carbonate, barium hydroxide, barium isopropoxide, barium stearate, barium octanoate, barium neodecanate and barium 2-ethylhexanoate. Barium isopropoxide, barium citrate, and barium formate are preferred; barium citrate and barium formate are more preferred; and, barium formate is particularly preferred.

Possible binders include acidic aluminum oxide sol, alkaline aluminum oxide sol, and ammonium aluminum oxide sol. Preferably, an alkaline binder is used to prevent dissolution and redistribution of particles. Ammonium aluminum oxide sol is preferred. The ammonium sol of aluminum oxide preferably is included in an amount of at least about 2 wt %, and more preferably at least about 4 wt %, and particularly preferred at about 6 wt %.

The following examples are provided to further describe the invention. The examples are intended to be illustrative in nature and are not to be construed as limiting the scope of the invention.

EXAMPLE 1

A solution is made containing 82 grams zirconium tetraamine citrate, 30 grams ammonium citrate dibasic and 1000 grams water. About 1000 grams of Zeolyst CBV 3024E an ammonium cationic zeolite is added to the solution. The mixture is maintained at about 40° C. and stirred for about 4 hours. The mixture is filtered and the powder is dried then calcined at 500° C. for 4 hours. A washcoating slurry is made by adding the calcined zirconium-zeolite powder and enough water for a 38 wt % solids solution. 80 grams of Condea Vista disperal Al 25/5 80 aluminum hydroxide sol at 25 wt % solids is added to the slurry. The slurry is coated on a 600 cell/in3 cordierite monolith and calcined to 500° C. for 4 hours. The calcined washcoat weight is targeted to 3.0 g/in3. The calcined washcoat consists of 3.0 wt % zirconium stabilized on a zeolite.

EXAMPLE 2

A solution is made containing 82 grams zirconium tetraamine citrate, 30 grams ammonium citrate dibasic and 1000 grams water. About 1000 grams of Zeolyst CBV 3024E is added to the solution. The mixture is maintained at about 40° C. and stirred for about 4 hours. The mixture is filtered and the powder is dried then calcined at 500° C. for 4 hours.

A solution is made containing 30 grams ammonium citrate dibasic and 1000 grams water. 1000 grams of the zirconium doped zeolite is added to the solution. The mixture is maintained at about 80° C. and stirred for about 1 hour. 88 grams of cobalt formate is added to the solution. The mixture is maintained 80° C. and stirred for about 3 hours. The mixture is filtered and the powder is dried then calcined at 500° C. for 4 hours.

Adding the calcined cobalt-zirconium-zeolite powder and enough water for a 38 wt % solids solution makes a washcoating slurry. 80 grams of Condea Vista disperal Al 25/5 80 aluminum hydroxide sol at 25 wt % solids is added to the slurry. The slurry is coated on a 600 cell/in3 cordierite monolith and calcined to 500° C. for 4 hours. The calcined washcoat weight is targeted to 3.0 g/in3. The calcined washcoat consists of 3.0 wt % zirconium and 1.9 wt % cobalt stabilized on a zeolite.

EXAMPLE 3

A solution is made containing 82 grams zirconium tetraamine citrate, 30 grams ammonium citrate dibasic and 1000 grams water. About 1000 grams of Zeolyst CBV 3024E is added to the solution. The mixture is maintained at about 40° C. and stirred for about 4 hours. The mixture is filtered and the powder is dried then calcined at 500° C. for 4 hours.

A solution is made containing 30 grams ammonium citrate dibasic and 1000 grams water. 1000 grams of the zirconium doped zeolite is added to the solution. The mixture is maintained at about 80° C. and stirred for about 1 hour. 87 grams of manganese formate is added to the solution. The mixture is maintained 80° C. and stirred for about 3 hours. The mixture is filtered and the powder is dried then calcined at 500° C. for 4 hours.

Adding the calcined manganese-zirconium-zeolite powder and enough water for a 38 wt % solids solution makes a washcoating slurry. 80 grams of Condea Vista disperal Al 25/5 80 aluminum hydroxide sol at 25 wt % solids is added to the slurry. The slurry is coated on a 600 cell/in3 cordierite monolith and calcined to 500° C. for 4 hours. The calcined washcoat weight is targeted to 3.0 g/in3. The calcined washcoat consists of 3.0 wt % zirconium and 1.8 wt % manganese stabilized on a zeolite.

EXAMPLE 4

A solution is made containing 82 grams zirconium tetraamine citrate, 30 grams ammonium citrate dibasic and 1000 grams water. About 1000 grams of Zeolyst CBV 3024E is added to the solution. The mixture is maintained at about 40° C. and stirred for about 4 hours. The mixture is filtered and the powder is dried then calcined at 500° C. for 4 hours.

A solution is made containing 30 grams ammonium citrate dibasic and 1000 grams water. 1000 grams of the zirconium doped zeolite is added to the solution. The mixture is maintained at about 80° C. and stirred for about 1 hour. 74 grams of barium formate is added to the solution. The mixture is maintained 80° C. and stirred for about 3 hours. The mixture is filtered and the powder is dried then calcined at 500° C. for 4 hours.

Adding the calcined barium-zirconium-zeolite powder and enough water for a 38 wt % solids solution makes a washcoating slurry. 80 grams of Condea Vista disperal Al 25/5 80 aluminum hydroxide sol at 25 wt % solids is added to the slurry. The slurry is coated on a 600 cell/in3 cordierite monolith and calcined to 500° C. for 4 hours. The calcined washcoat weight is targeted to 3.0 g/in3. The calcined washcoat consists of 3.0 wt % zirconium and 1.8 wt % manganese stabilized on a zeolite.

EXAMPLE 5

A solution is made containing 74 grams barium formate, 30 grams ammonium citrate dibasic and 1000 grams water. About 1000 grams of Zeolyst CBV 3024E is added to the solution. The mixture is maintained at about 40° C. and stirred for about 4 hours. The mixture is filtered and the powder is dried then calcined at 500° C. for 4 hours. Adding the calcined barium-zeolite powder and enough water for a 38 wt % solids solution makes a washcoating slurry. 80 grams of Condea Vista disperal Al 25/5 80 aluminum hydroxide sol at 25 wt % solids is added to the slurry. The slurry is coated on a 600 cell/in3 cordierite monolith and calcined at 500° C. for 4 hours. The calcined washcoat weight is targeted to 3.0 g/in3. The calcined washcoat consists of 4.5 wt % barium stabilized zeolite.

EXAMPLE 6

A solution is made containing 74 grams barium formate, 30 grams ammonium citrate dibasic and 1000 grams water. About 1000 grams of Zeolyst CBV 3024E is added to the solution. The mixture is maintained at about 40° C. and stirred for about 4 hours. The mixture is filtered and the powder is dried then calcined at 500° C. for 4 hours.

A solution is made containing 30 grams ammonium citrate dibasic and 1000 grams water. 1000 grams of the barium doped zeolite is added to the solution. The mixture is maintained at about 80° C. and stirred for about 1 hour. 88 grams of cobalt nitrate is added to the solution. The mixture is maintained 80° C. and stirred for about 3 hours. The mixture is filtered and the powder is dried then calcined at 500° C. for 4 hours.

Adding the calcined barium-cobalt-zeolite powder and enough water for a 38 wt % solids solution makes a washcoating slurry. 80 grams of Condea Vista disperal Al 25/5 80 aluminum hydroxide sol at 25 wt % solids is added to the slurry. The slurry is coated on a 600 cell/in3 cordierite monolith and calcined at 500° C. for 4 hours. The calcined washcoat weight is targeted to 3.0 g/in3. The calcined washcoat consists of 2.0 wt % cobalt supported on 4.5 wt % barium stabilized zeolite.

EXAMPLE 7

A solution is made containing 30 grams barium citrate and 1000 grams water. About 1000 grams of Zeolyst CBV 3024E is added to the solution. The mixture is maintained at about 40° C. and stirred for about 1 hour. 74 grams barium formate is added to the solution. The mixture is maintained at about 40° C. and stirred for about 3 hours. The mixture is filtered and the powder is dried then calcined at 500° C. for 4 hours.

A solution is made containing 30 grams ammonium citrate dibasic and 1000 grams water. 1000 grams of the barium doped zeolite is added to the solution. The mixture is maintained at about 80° C. and stirred for about 1 hour. 87 grams of manganese formate is added to the solution. The mixture is maintained 80° C. and stirred for about 3 hours. The mixture is filtered and the powder is dried then calcined at 500° C. for 4 hours.

Adding the calcined barium-manganese-zeolite powder and enough water for a 38 wt % solids solution makes a washcoating slurry. 80 grams of Condea Vista disperal Al 25/5 80 aluminum hydroxide sol at 25 wt % solids is added to the slurry. The slurry is coated on a 600 cell/in3 cordierite monolith and calcined at 500° C. for 4 hours. The calcined washcoat weight is targeted to 3.0 g/in3. The calcined washcoat consists of 2.0 wt % manganese supported on 4.5 wt % barium stabilized zeolite.

EXAMPLE 8

A solution is made containing 30 grams barium citrate and 1000 grams water. About 1000 grams of Condea Vista Disperal aluminum oxide is added to the solution. The mixture is maintained at about 40° C. and stirred for about 1 hour. 74 grams barium formate is added to the solution. The mixture is maintained at about 40° C. and stirred for about 3 hours. The mixture is filtered and the powder is dried then calcined at 500° C. for 4 hours.

Adding the calcined barium-aluminum oxide powder and enough water for a 38 wt % solids solution makes a washcoating slurry. 80 grams of Condea Vista disperal Al 25/5 80 aluminum hydroxide sol at 25 wt % solids is added to the slurry. The slurry is coated on a 600 cell/in3 cordierite monolith and calcined at 500° C. for 4 hours. The calcined washcoat weight is targeted to 3.0 g/in3. The calcined washcoat consists 4.5 wt % barium stabilized zeolite.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. A $NO_x$ occluding catalyst for adsorbing oxides of nitrogen from an exhaust gas of an internal combustion engine wherein said NOx occluding catalyst is selected from the group consisting of barium-zeolite, barium-zirconium zeolite, and barium-rare earth-zeolite, having a surface area at least about 200 $m^2/g$, and further comprising a transition metal oxide supported on specific zeolite sites wherein said transition metal oxide has a surface area of at least about 75 $m^2/g$.

2. The catalyst of claim 1 wherein the transition metal oxide is selected from the group consisting of cobalt oxide and manganese oxide.

3. The catalyst of claim 2 wherein the transition metal oxide has a surface area of at least about 150 $m^2/g$.

4. A $NO_x$ occluding catalyst for adsorbing oxides of nitrogen from an exhaust gas of an internal combustion engine wherein the $NO_x$ occluding catalyst is selected from the group consisting of barium-zeolite, barium-zirconium zeolite, barium-alumina, and barium-rare earth-zeolite, having a surface area at least about 200 $m^2/g$ to about 500 $m^2/g$, and wherein the $NO_x$ occluding catalyst further comprises a transition metal oxide selected from the group consisting of CoO and manganese oxide, wherein the transition metal oxide has a surface area of about 75 $m^2/g$ to about 150 $m^2/g$.

5. A method for making a NOx occluding catalyst, comprising:

mixing a zirconium solution with a zeolite to distribute the zirconium on specific zeolite sites, wherein the zeolite has pores, and wherein the zirconium solution is a combination of zirconium citrate and zirconium formate;

mixing a transition metal solution with the zeolite to attach the transition metal to specific zeolite sites; and mixing an alkaline earth active catalyst site solution with the zeolite, wherein the zirconium solution is mixed with the zeolite prior to mixing the alkaline earth active catalyst site solution with the zeolite.

6. A method for making a NOx occluding catalyst comprising:

mixing an alkaline earth active catalyst site solution with a zeolite, wherein the zeolite has pores; and mixing a transition metal solution with the zeolite to attach the transition metal to specific zeolite sites, wherein prior to the mixing of the alkaline earth active catalyst site solution with the zeolite, the zeolite is mixed with a solution including a molecule having a size too large to enter the zeolite pores and with a solution of a second smaller molecule having a size that can enter the zeolite pores.

7. The method of claim 6, wherein the molecule too large to enter the zeolite pores is selected from the group consisting of ammonium zirconium citrate and zirconium citrate, and wherein the second molecule comprises zirconium formate.

* * * * *